(12) United States Patent
Infante

(10) Patent No.: US 10,758,070 B1
(45) Date of Patent: Sep. 1, 2020

(54) MULTI-PURPOSE COOKING TOOL

(71) Applicant: Magnefuse, LLC, Miami, FL (US)

(72) Inventor: Alfredo Infante, Miami, FL (US)

(*) Notice: Subject to any disclaimer, the term of this patent is extended or adjusted under 35 U.S.C. 154(b) by 148 days.

(21) Appl. No.: 15/979,677

(22) Filed: May 15, 2018

Related U.S. Application Data

(60) Provisional application No. 62/484,763, filed on Apr. 12, 2017.

(51) Int. Cl.
*A47G 21/06* (2006.01)
*A47J 43/28* (2006.01)
*A47G 21/10* (2006.01)
*A47G 21/04* (2006.01)

(52) U.S. Cl.
CPC ............ *A47G 21/06* (2013.01); *A47G 21/10* (2013.01); *A47J 43/281* (2013.01); *A47J 43/283* (2013.01); *A47J 43/288* (2013.01); *A47G 21/04* (2013.01)

(58) Field of Classification Search
CPC ........ A47G 21/06; A47G 21/10; A47G 21/04; A47J 43/281; A47J 43/283; A47J 43/288
See application file for complete search history.

(56) References Cited

U.S. PATENT DOCUMENTS

| 212,044 | A | * | 2/1879 | Nott | A47G 21/02 7/112 |
|---|---|---|---|---|---|
| 253,634 | A | * | 2/1882 | Shinn | A47G 21/02 7/112 |
| 4,317,284 | A | * | 3/1982 | Prindle | A47G 21/06 30/340 |
| 4,332,409 | A | * | 6/1982 | Stachowicz | A47J 43/283 294/2 |
| 5,819,612 | A | * | 10/1998 | Anderson | B25G 1/085 81/490 |
| 8,528,736 | B2 | * | 9/2013 | Teys | A47G 21/004 206/532 |
| 2012/0297548 | A1 | * | 11/2012 | Solari | A47J 43/283 7/113 |

* cited by examiner

Primary Examiner — Hadi Shakeri
(74) Attorney, Agent, or Firm — Sanchelima & Associates, P.A.; Christian Sanchelima; Jesus Sanchelima

(57) ABSTRACT

A multipurpose cooking tool including a spatula having a hollow handle that at least partially houses a tong member and a fork member therein using two compartments located within the handle of the spatula. The fork and the tong can be securely held within their respective compartment using magnets.

13 Claims, 6 Drawing Sheets

MULTI-PURPOSE COOKING TOOL

RELATED APPLICATIONS

The present invention claims priority and benefit of U.S. provisional application 62/484,763 filed on Apr. 12, 2017 and is herein incorporated by reference

BACKGROUND OF THE INVENTION

Field of the Invention

The present invention relates to a kitchen utensil and, more particularly, to multi-purpose kitchen utensil that combines a tong, a prong, and a spatula.

Description of the Related Art

Several designs for a multi-purpose kitchen utensil have been designed in the past. None of them, however, include a configuration as a spatula in its initial position that maintains the necessary curvature to keep a user's hands safely away from a heating element.

Applicant believes that a related reference corresponds to U.S. patent application No. US2013305893 filed by Ben Kaufman. However, it differs from the present invention because the Kaufman reference includes a device that is a tong in its initial configuration and requires a cumbersome clipping attachment means to clip its prong to one of the faces of the tong, thereby converting the utensil into a spatula in a way that does not provide for the curvature to keep a user's hands safely away from heat. In addition, the Kaufman reference includes complicated clip attachment means that are difficult to use and prone to failure.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a a kitchen utensil that cooperates with a plurality of purposes required around a kitchen or a bar-b-q setting.

It is another object of this invention to provide a multi-purpose kitchen utensil that is ergonomic and can be easily and readily stored with a minimalist profile and space requirements.

It is still another object of the present invention to provide a multi-purpose kitchen utensil that includes a tong, prong, and spatula whereby the spatula maintains a curvature to keep a user's hands safely away from a heat source.

It is yet another object of this invention to provide such a kitchen utensil that allows a user to easily transition from one utensil to the next in the same device.

It is another object of the present invention to secure the various utensils housed within the spatula using magnets and/or the forces associated with the sides of the channel pressing against the housed utensil.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
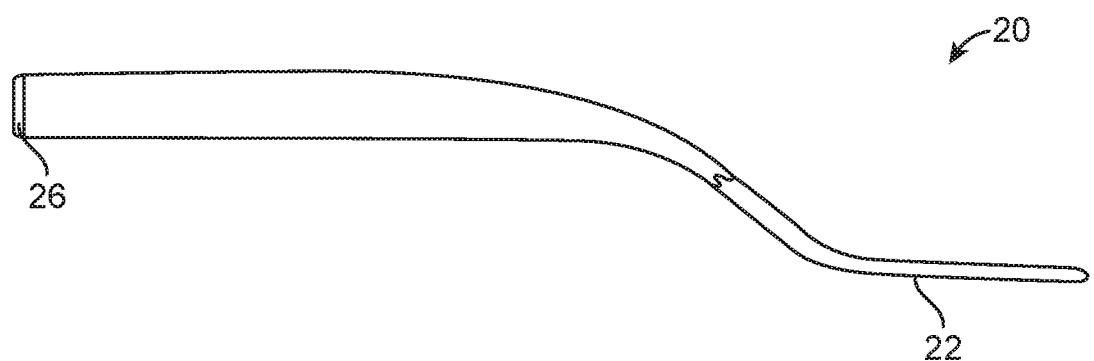
FIG. 1 represents a side elevational view of the present invention showing the initial configuration as a spatula maintaining the curvature between the spatula's face and its handle.
Figure 2:
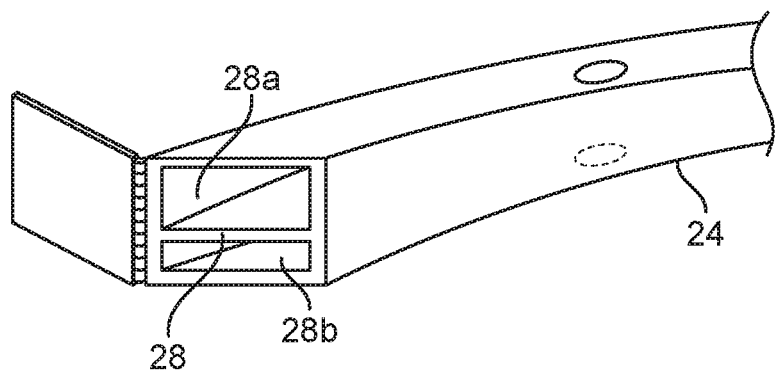
FIG. 2 shows an isometric enlarged view of the distalmost end of the handle of the spatula showing an opening wherein channels can be used to slide the additional kitchen utensils.
Figure 3:
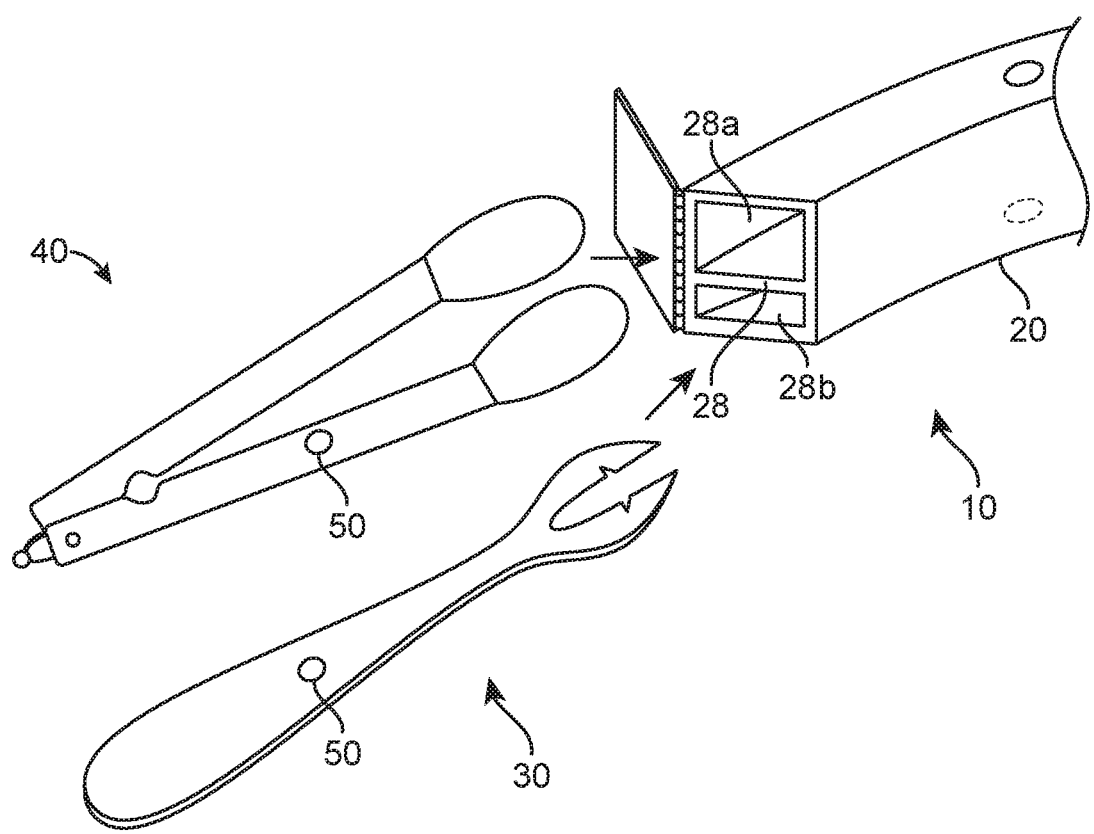
FIG. 3 illustrates a partial isometric view of the present invention wherein the prong and tong assembly are shown having a magnet depicted at a predetermined point along the tools that cooperates ferromagnetically with a complementing element housed within the channels. The tong/prong can include a male attachment member that cooperates with the female ferromagnetic attachment member found in the channel. The magnetic attraction can also be carried out using magnets of complementing polarity. One magnet can be located at a point along on the prong or tong, and the other within the spatula's channel.
Figure 4:
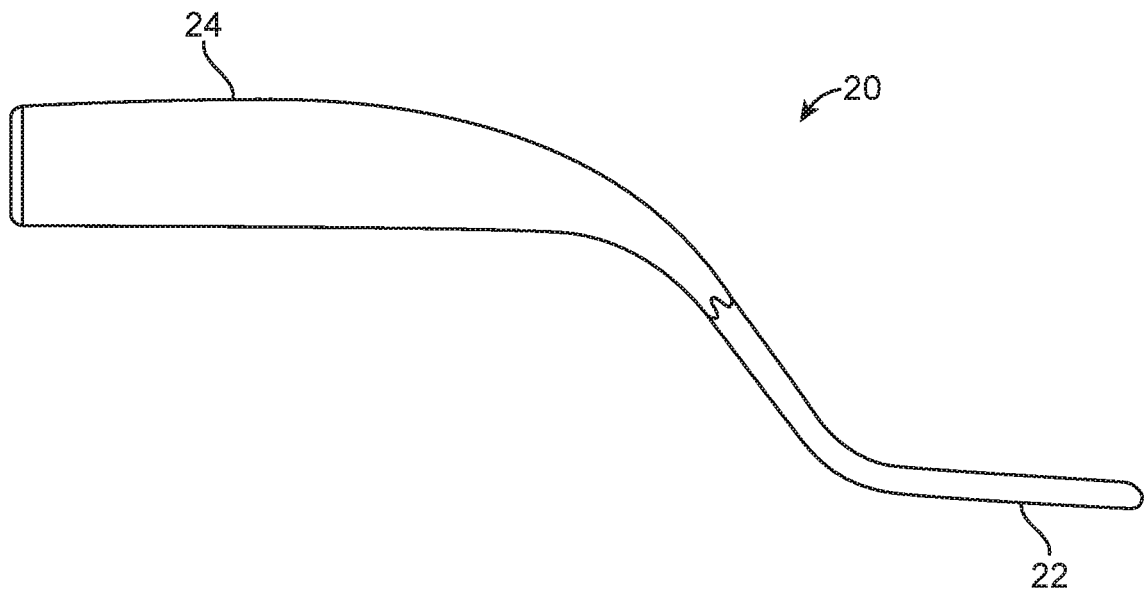
FIG. 4 shows another embodiment of the spatula assembly wherein hinged means are shown to allow the working face of the spatula to be folded upwards or downwards.

Referring now to the drawings, where the present invention is generally referred to with numeral 10, it can be observed that it basically includes a spatula assembly 20, a prong 30 assembly, and a tong assembly 40.

Spatula assembly 20 includes a flat working face 22, a handle member 24 and a hollow channel 26 travelling longitudinally along hollow channel 26 includes dividers 28 that separate at least two compartments 28a; 28b. In an alternate embodiment, one compartment may be used. Handle member 24 includes a curved configuration between the handle and the working face 22 to keep a user's hands safely away from a heat source.

Prong assembly 30 and tong assembly 40 can be journaled within compartments 28a; 28b and be securely mounted inside handle member 24 using magnets or frictional forces that lock each utensil in place when housed therein. When using a magnet, a magnet element 50 will be located at the hinged junction for tong assembly 40 and at the prong's handle's distalmost end for the prong assembly 30 in order to maintain the magnet members 50 as far away from the heat as possible.

Figure 6:
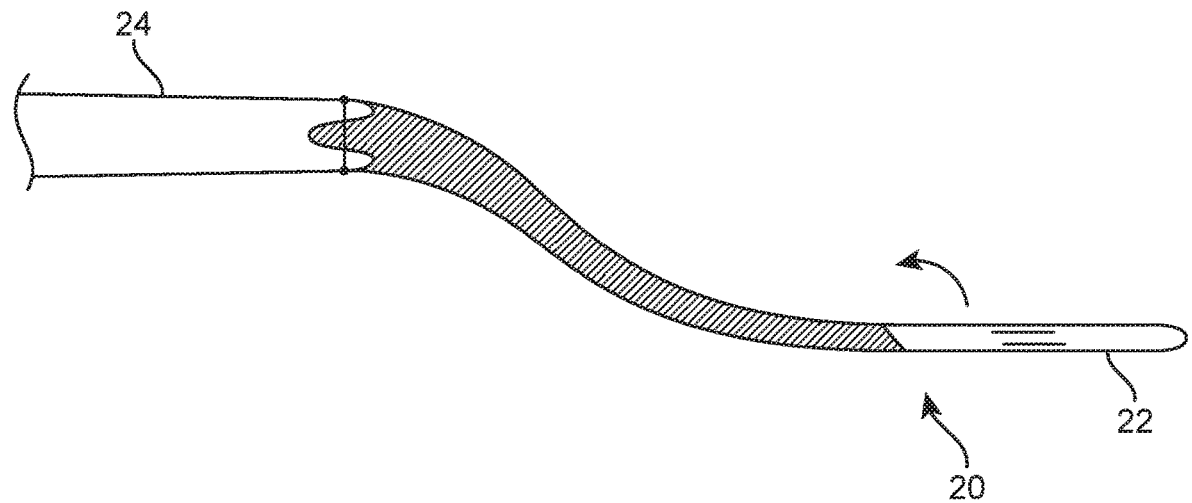
FIG. 6 shows a cross-sectional view of the spatula assembly wherein a prong assembly is shown locked inside the channel within the spatula assembly using frictional forces and a complementing rivet/screw means to further fasten it in place.

In an alternate embodiment, additional compartments can be added to the top or bottom of handle member 24 and similarly use frictional forces or magnets to keep additional utensils in place. FIG. 6 shows frictional forces compressing the working end of prong assembly 30 thereby locking it within spatula assembly 20. Additionally, at least one screw member or rivet assembly can be used to keep prong assembly 30 in place. A magnet of opposite polarity can be mounted to the distal end of the spatula's handle member 24 to similarly keep the magnet as far away from the heat as possible. In this embodiment, the tong assembly 40 and prong assembly 30 will be slid into their respective compartments with their working side being inserted first.

Figure 5:
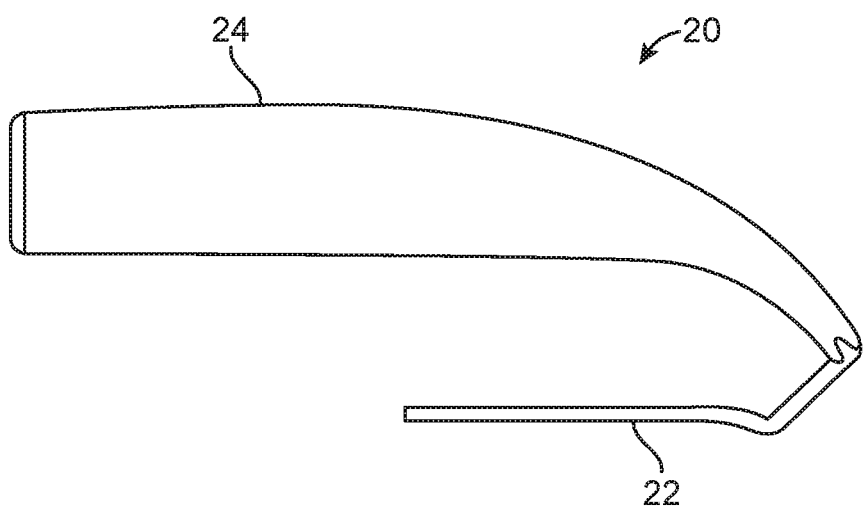
FIG. 5 illustrates the alternate embodiment shown in FIG. 4 with the spatula's working face folded down.

In an alternate embodiment, spatula assembly 20 can include at least one serrated edge along at least one side of working flat face 22 so that the spatula assembly 20 can double as a knife as well. Further, working flat face 22 can be hingedly mounted to handle member 24 to allow it to fold upwards or downwards, as shown in FIG. 5 to minimize its profile for transportation and storage purposes.

Figure 7:
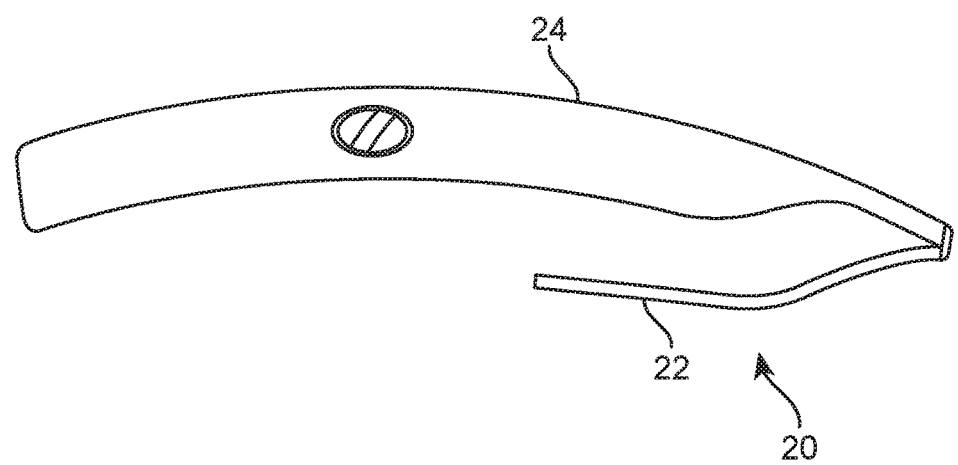
FIG. 7 shows the alternate embodiment described in FIG. 5 wherein a magnet is located in the middle of the spatula assembly to optimize the center of gravity for the tools and further stabilize the tool.
Figure 8:
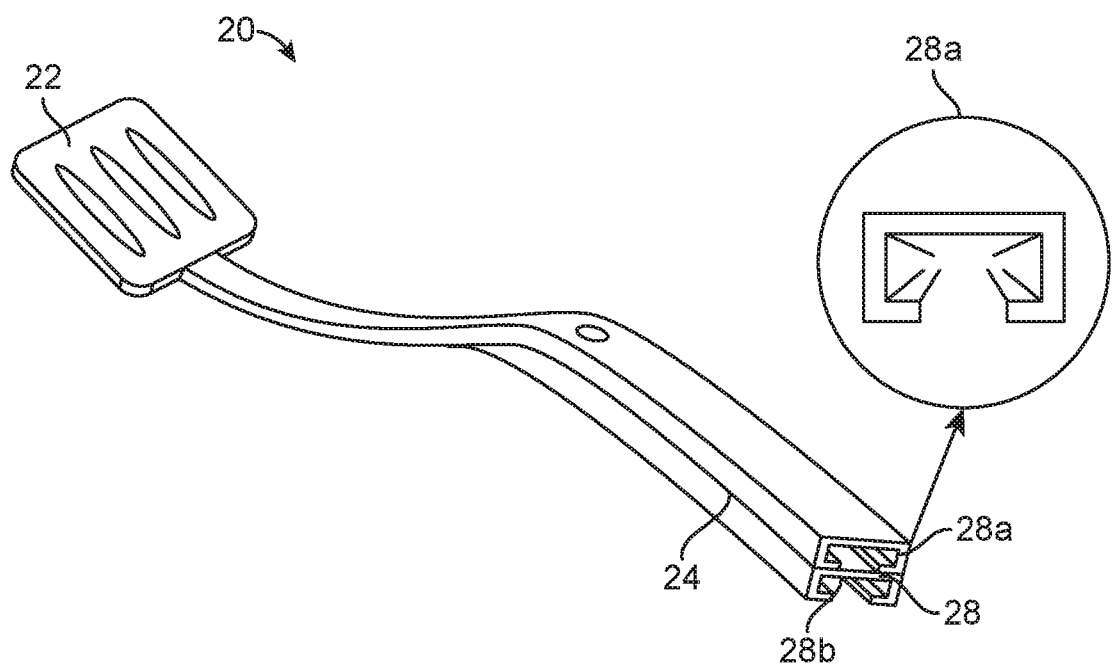
FIG. 8 represents an isometric view of the spatula assembly having two compartments for the prong and tong assemblies. An enlarged view is shown of the inside of the compartment wherein a lip or ledge is used to hold the tools in place using frictional or compressive forces.
Figure 9:
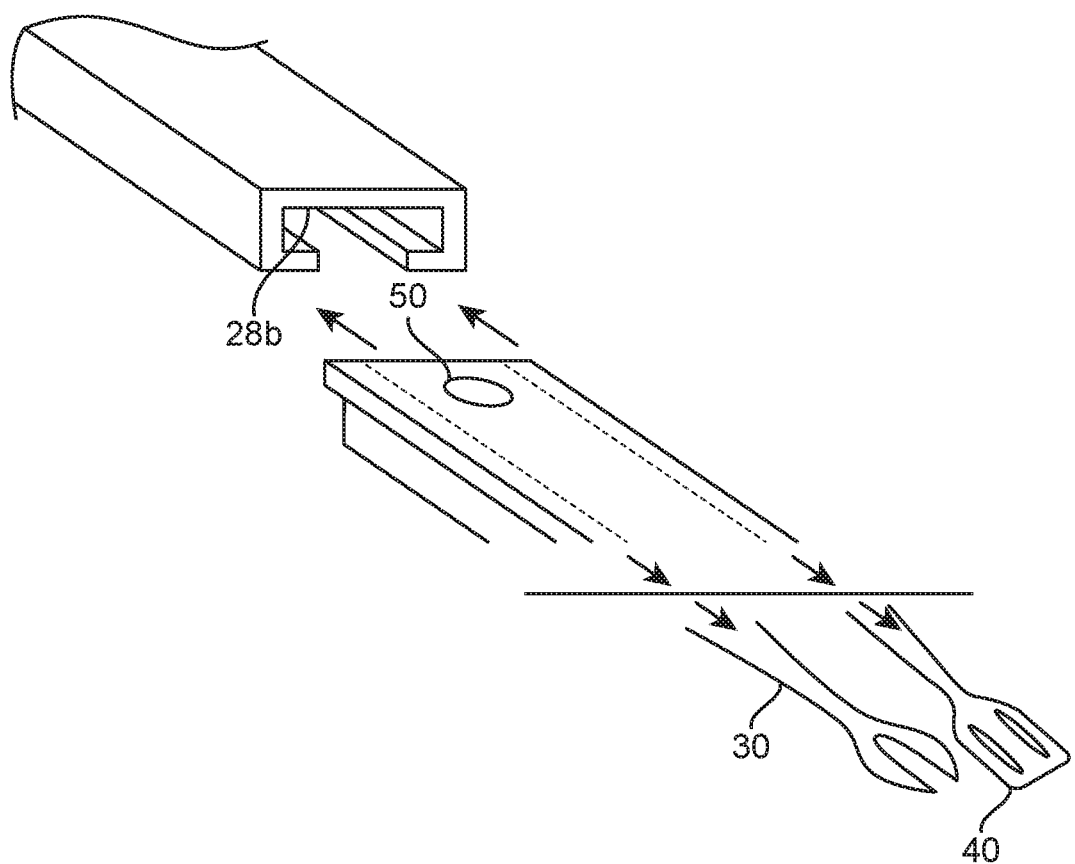
FIG. 9 is a partial enlarged view of the handle of the spatula assembly wherein the prong and tong members can be seen partially expelled from at least one compartment. A magnet in the at least one compartment can be seen to lock the tool therein. The at least one tool can have its own complementing magnet that is attracted to the magnet in the at least one compartment.
Figure 10:
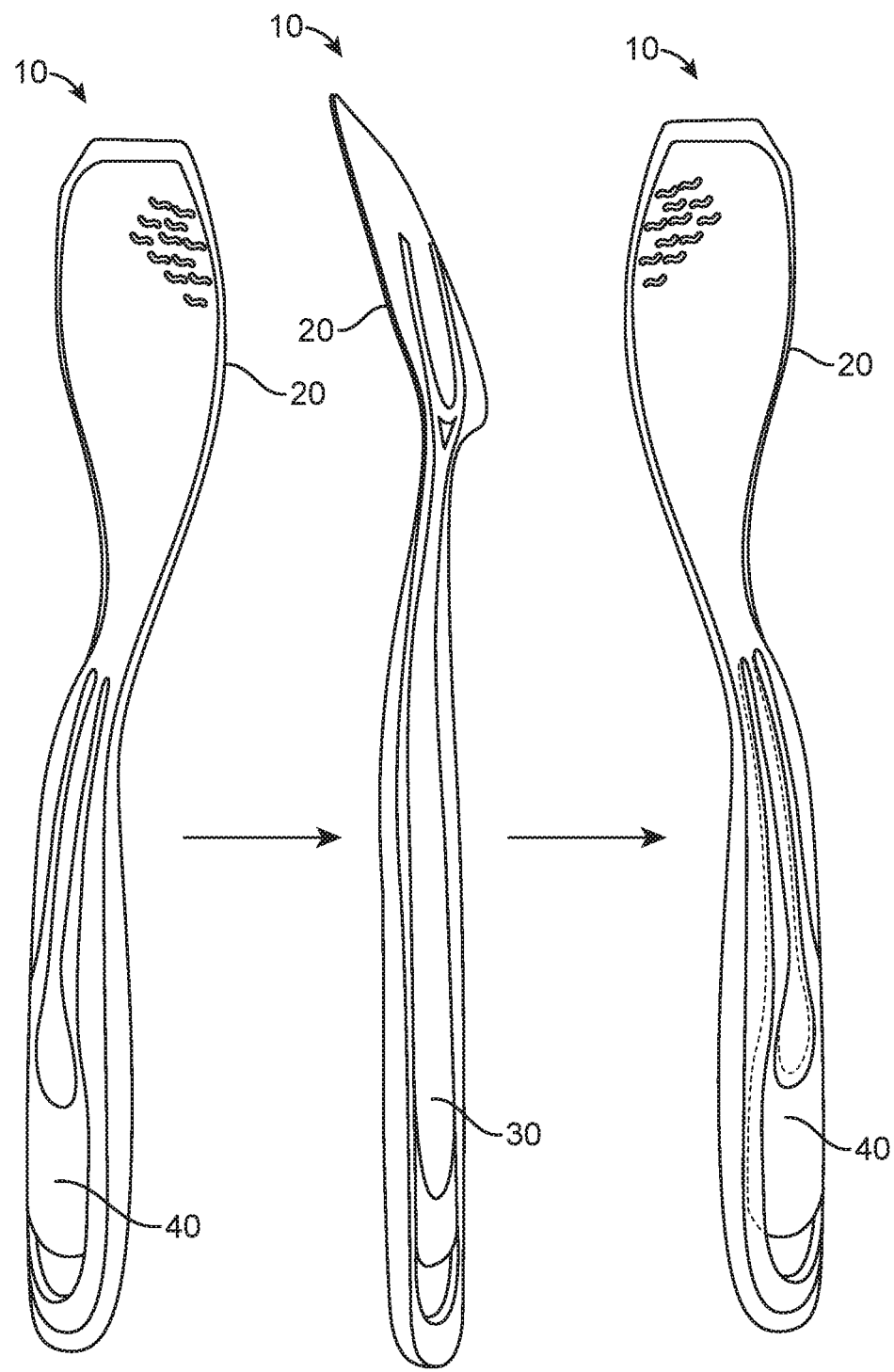
FIG. 10 shows an alternate embodiment wherein the tong assembly is nested within the top of the spatula assembly's handle. The tong assembly's fork members are compressed together using cooperating grooves in the top of the spatula assembly's handle to keep it in place. The prong assembly is shown in the underside of the spatula assembly's handle and can be seen flushedly mounted therein using a channel that receives the handle of the prong assembly.

As shown in FIG. 7, a magnet is found at substantially the center of the spatula assembly 20 to better balance the weight of the tool. Similarly, a magnet or other balancing means can be installed in the additional tools to optimize its stability. Also, the compartments 28a; 28b can be covered at the rear distal end of spatula assembly 20 using a hinged door that can be raised using manual force or by implementing a button that opens the door. Further the tools can be pushed out of the compartments 28a; 28b using spring-loaded means to facilitate a user grasping the housed tools.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multipurpose cooking tool, comprising:
a spatula having a hollow handle including a first compartment and a second compartment, said first compartment being entirely above of said second compartment, a tong member at least partially housed within said first compartment and a fork member at least partially housed within said second compartment, said fork member includes a fork magnet member on a fork shaft of said fork member and said tong member includes a tong magnet member on at least one tong shaft, said hollow handle includes a first and second handle magnet member, said first handle magnet being on a ceiling of said first compartment, said second handle magnet member being within said second compartment, said tong magnet member and said fork magnet member cooperate with said first and second handle magnet member, respectively, thereby securing said tong member and said fork member within said first and second compartment, respectively, said first and second compartment are covered by a hingedly mounted door attached to a distal end of said hollow handle, said door mounted to lateral sides of said first and second compartment.

2. The multipurpose cooking tool of claim 1 wherein said tong member and said fork member are separated using a partition.

3. The multipurpose cooking tool of claim 2 wherein said handle has a length, said partition runs along the length of said handle.

4. The multipurpose cooking tool of claim 2 wherein said partition has an H-shape defined by said partition's side walls and a partition member perpendicular to each partition side wall.

5. The multipurpose cooking tool of claim 1 wherein said spatula has a blade portion and a neck portion, said neck portion dividing said hollow handle from said blade portion, said neck portion hingedly mounting said blade portion to said hollow handle thereby allowing said blade portion to fold over or under said hollow handle.

6. The multipurpose cooking tool of claim 5, wherein said blade portion is a pivoting blade portion, said blade portion pivots about said neck portion.

7. The multipurpose cooking tool of claim 5, wherein a spacing is defined between said blade portion and said hollow handle when said blade portion is in a folded configuration, said blade portion being parallel to said hollow handle in said folded configuration.

8. The multipurpose cooking tool of claim 1 wherein said spatula includes a blade portion, a bottle opener on said handle or said blade portion.

9. The multipurpose cooking tool of claim 1, wherein said spatula further includes a curvature, said curvature adapted to keep the hand of a user away from a heat source.

10. The multipurpose cooking tool of claim 1, wherein said first compartment is directly above of said second compartment, said first compartment is larger than said second compartment.

11. The multipurpose cooking tool of claim 1, said door being perpendicular to said first and second compartment when said door is in an open configuration, said door being flush with said handle in a closed configuration, said door being flat and extending horizontally over both of said first and second compartment simultaneously.

12. The multipurpose cooking tool of claim 1, wherein said first and second handle magnet member are parallel to each other.

13. The multipurpose cooking tool of claim 1, wherein said first and second handle magnet member, said fork magnet member and said tong magnet member are ferromagnetically attracted.

* * * * *